United States Patent Office 3,528,299
Patented Sept. 15, 1970

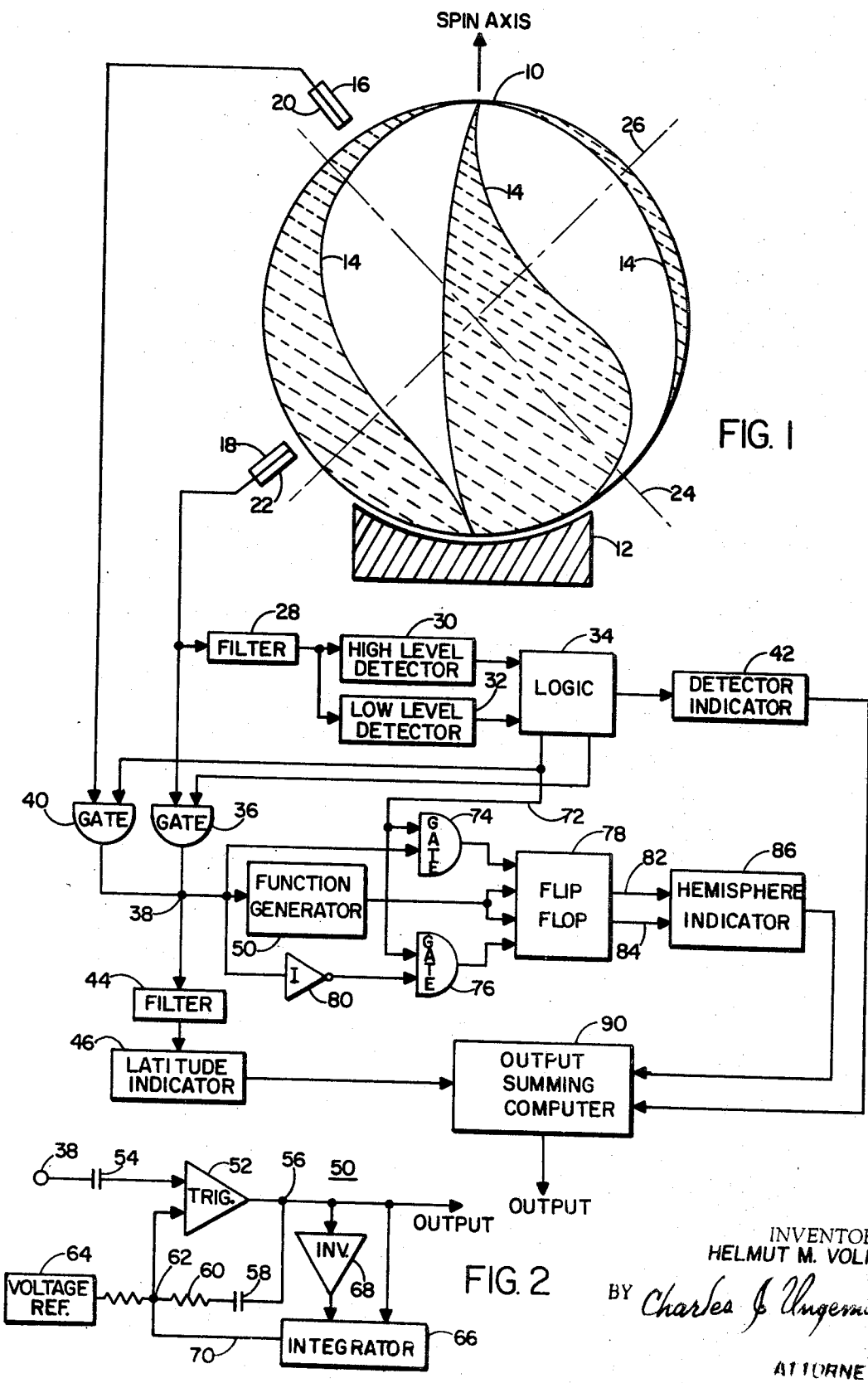

3,528,299
PATTERNED ROTOR WITH REFLECTIVE CHARACTERISTICS
Helmut M. Volk, Falcon Heights, Minn., assignor to Honeywell Inc., Minneapolis, Minn., a corporation of Delaware
Filed May 28, 1968, Ser. No. 732,660
Int. Cl. G01c 19/28
U.S. Cl. 74—5.6
5 Claims

ABSTRACT OF THE DISCLOSURE

A gyroscope rotor attitude pickoff utilizing a patterned rotor with reflective characteristics that vary with latitude and optical sensors. Electronic circuitry operates to select the sensor which will provide an optimum reading of the rotor position.

BACKGROUND OF THE INVENTION

The field of art to which this invention pertains is that in which the attitude of a spinning spherical gyroscope rotor is measured by sensors which detect the passage of a pattern on the surface of the rotor as it spins. In the prior art, sensors of this sort work only for a predetermined maximum misalignment of the rotor because of the ambiguity introduced in the polar regions. If the apparatus rotates beyond this maximum capability, the readout becomes useless or at best, inaccurate. The present invention operates to alleviate these problems.

SUMMARY OF THE INVENTION

My invention contemplates using two separate pickoffs positioned approximately 90° apart about the rotor. Special circuits monitor the outputs of these pickoffs so that when the operating pickoff reaches an area in which it becomes inefficient or inoperative, the apparatus switches over and uses the other pickoff which will now be in a more desirable area since it is approximately 90° away. As a result, information is always obtained from a pickoff which is in an optimum position and no ambiguities are introduced. It is, therefore, an object of the present invention to provide an improved control apparatus. A further object of my invention is to provide an improved attitude pickoff for a gyroscope. Other objects and advantages will become apparent to those skilled in the art upon consideration of the following description and drawings.

BRIEF DESCRIPTION OF THE DRAWINGS

FIG. 1 is a schematic diagram showing generally the arrangement of major elements in the present invention.

FIG. 2 is a schematic circuit drawing of the function generator in FIG. 1.

DESCRIPTION OF THE PREFERRED EMBODIMENT

Referring to FIG. 1, a gyroscope rotor 10 is shown universally supported by means well known to those skilled in the art such as electrostatically or by gas bearing shown symbolically in FIG. 1 as support 12. Four identical darkened patterns 14 are formed on rotor 10 so that the reflective characteristics of the rotor will vary linearly from top to bottom as the rotor spins about the spin axis shown in FIG. 1. A pair of light sources 16 and 18 direct illumination onto rotor 10 so that detectors 20 and 22 may sense the passage of the patterns underneath as rotor 10 spins. The outputs from detectors 20 and 22 are square waves having pulses of width proportional to the width of the reflecting areas between the darker areas 14 and, therefore, proportional to the latitude on the rotor which the pickoff is viewing. The output of these detectors is less accurate near the poles of rotor 10. At the poles there is no meaningful output at all. Consequently, it is desirable to utilize only the pickoff which is monitoring the rotor over a range of latitudes near the equator. In FIG. 1, two center lines 24 and 26 serve to define the area in which it is desirable to operate a pickoff. Since pickoffs 20 and 22 are 90° apart, at least one of these pickoffs will always be between lines 24 and 26 somewhere relatively near the equator. In FIG. 1, rotation of the rotor clockwise or counter clockwise is all that is being considered.

In order to choose the detector which is in the optimum position, the signal from detector 22 is filtered by a filter 28 and presented to a high level detector 30 and a low level detector 32. Filter 28 integrates the pulses from detector 22 into a continuous voltage level which will vary in accordance with the pulse width and hence the latitude on the rotor. High level detector 30 will be activated when detector 22 is above line 24 and line 26. Low level detector 32 is activated if detector 22 is above line 26 (speaking of the left side of rotor 10). When detector 22 is above line 26 but below line 24, the high level detector will be off but the low level detector will be on. This condition is sensed by logic circuitry 34 which operates to open a gate 36 so that the signal at point 38 is the signal from detector 22. If detector 22 leaves this predetermined zone on rotor 10, either high level detector 30 will come on or low level detector 32 will go off. Thus when both detectors 30 and 32 are either on or off together, logic circuit 34 will close gate 36 and open gate 40 so that the signal presented to point 38 is that from detector 20. In this way, only the detector which is operating within the predetermined zone is utilized. Logic circuit 34 also presents a signal to a pickoff indicator 42 which indicates which detector is in operation.

The determination of the precise attitude of rotor 10 is achieved by directing the signal from point 38 through a filter 44 which integrates the signal into a voltage level proportionate to the latitude on the rotor at which the detector in operation is viewing. This voltage signal is presented to a latitude indicator 46 which operates to further define the position of rotor 10.

There is still one ambiguity as to the position of the rotor in that the on/off condition of detectors 30 and 32 may also occur when detector 22 is on the right side of rotor 10 in the opposite hemisphere. To resolve this ambiguity, the signal from detector 20 is used to determine whenever detector 22 passes into a different hemisphere. Because detectors 20 and 22 are 90° apart whenever detector 22 passes into the righthand hemisphere, detector 20 will cross the equator of rotor 10. Thus, the output of detector 20 is compared to a signal identical to that which would be received at the equator. If detector 20 is crossing the equator, detector 22 is entering a different hemisphere. This simulated equator signal which is a square wave in the preferred embodiment is produced by a function generator 50 which will be described in detail with respect to FIG. 2.

In FIG. 2 the circuit for function generator 50 is shown. The signal at point 38 is presented to a trigger circuit 52 through an input capacitor 54. Each time detector 20 senses a reflective area, the resultant signal operates to turn on trigger 52 so as to generate an output signal at point 56. The signal at point 56 returns to trigger 52 by means of a capacitor 58 and a resistor 60. A certain time delay will be introduced depending upon the time constant of capacitor 58 and resistor 60 and the voltage at point 62 as determined by a voltage reference 64. Thus, each time detector 20 encounters the reflective area, trigger 52 turns on for a short while until the feedback circuit turns it off again. The signal at point 56 will then be a square wave having a frequency corresponding to four times the frequency of rotation of rotor 10 and a pulse width determined by the delay in the feedback circuit. The signal from point 56 is presented to an integrator 66 directly and also after it has been inverted by an inverter 68. The purpose of the integrator is to produce a voltage level proportional to the difference in input pulse widths. By using sufficiently high gain, the integrator will produce a relatively large output voltage for small pulse width changes. If the wave at point 56 is a perfect square wave, it will cancel out when integrated with its own inverse, however, if the wave is not a perfect square wave, integrator 66 will generate a signal on lead 70 proportional in amplitude to the amount of variance from a square wave. The signal on lead 70 from integrator 66 changes the voltage at point 62 so as to drive trigger 52 toward pulse equality or very close thereto. Most spinning gyroscope rotors lose speed over a period of time. In effect, this change in speed will cause the pulse width to depart from symmetry as the rotor speed decreases. Integrator 66 reduces this non-symmetry to a negligible level by utilizing a high gain in the loop. Thus, function generator 50 operates to produce a square wave whose on time is equal to its off time and whose frequency is identical to that which detector 20 would sense at the equator of rotor 10.

Referring again to FIG. 1, logic circuit 34 senses when detector 20 should be in operation and by means of a lead 72, opens a pair of gates 74 and 76. Gates 74 and 76 pass the signal from point 38, which is the signal from detector 20, to flip-flop circuit 78. In one case, the signal from point 38 is inverted by an inverter 80. The reference square wave from function generator 50 is also presented to flip-flop 78 so that the signal from detector 20 may be mixed with the signal that would be gotten if it were directly at the equator. On one side of the equator, the output of flip-flop 78 will be on a lead 82 while on the other side of the equator, the resulting signal will cease on lead 82 and begin on lead 84 since the inverse signal will now produce an excess component. Receiving a signal on lead 82 or 84, hemisphere indicator 86 may indicate that detector 22 has crossed into a different hemisphere since detector 20 has crossed the equator. If desired, the outputs from detector indicator 42, hemisphere indicator 86 and latitude indicator 46 may be analyzed by an output summing computer 90 which could operate to keep track of the total angular movement of rotor 10. It will be obvious to those skilled in the art that this device may be modified in many ways without departing from the spirit and scope of the invention. For example, the particular electronic circuitry is not essential to the basic novel concept of selecting an optimum pickoff in order to avoid ambiguous solutions. Furthermore, pickoffs may be of any variety or type known to those skilled in the art.

I claim:
1. In apparatus such as a gyroscope:
   a rotor with a predetermined spin axis and equator, having a pattern on its surface, the pattern having radiation reflection characteristics which vary as a function of latitude on the rotor;
   means for supporting the rotor;
   means for spinning the rotor about its spin axis;
   means for directing radiation onto the rotor;
   a plurality of pickoffs mounted on the rotor supporting means, the pickoffs responsive to radiation reflected from the rotor; and
   means responsive to the output of the pickoffs operable to select a pickoff which is in a predetermined range of latitudes on the rotor.

2. The apparatus of claim 1 wherein the predetermined range of latitudes is near the equator of the rotor rather than near the spin axis.

3. The apparatus of claim 1 further including means for indicating which pickoff has been selected.

4. The apparatus of claim 3 further including means to compare the outputs of the pickoffs with the output of a function generator so as to sense the location of the pickoffs relative to the equator of the rotor, said function generator producing a signal identical to that which would be produced by a pickoff at the equator of the rotor and said function generator comprising a trigger circuit triggered by said pickoffs and turned off by its own output received through a delay path, the time constant of said delay path being varied by an integrator which compares the output of the trigger circuit with the inverse of the output of the trigger circuit.

5. The apparatus of claim 4 further including computer means responsive to the pickoff which is selected, the means indicating which pickoff is selected, and said comparing means so as to compute the total angular displacement and hence the attitude of the rotor.

References Cited

UNITED STATES PATENTS

| | | | |
|---|---|---|---|
| 2,959,060 | 11/1960 | Kunz | 74—5.6 |
| 3,071,976 | 1/1963 | Kunz | 74—5.6 |
| 3,270,567 | 9/1966 | Crampton | 74—5.6 |
| 3,313,161 | 4/1967 | Nordsieck | 74—5.6 |
| 3,328,595 | 6/1967 | Todd | 74—5.6 XR |
| 3,429,190 | 2/1969 | Dinter | 74—5.6 |
| 2,856,778 | 10/1958 | Kiebert | 74—5.6 |

MANUEL A. ANTONAKAS, Primary Examiner

U.S. Cl. X.R.

250—230